(Model.)
F. WARNER.
ANIMAL TRAP.
No. 450,545. Patented Apr. 14, 1891.
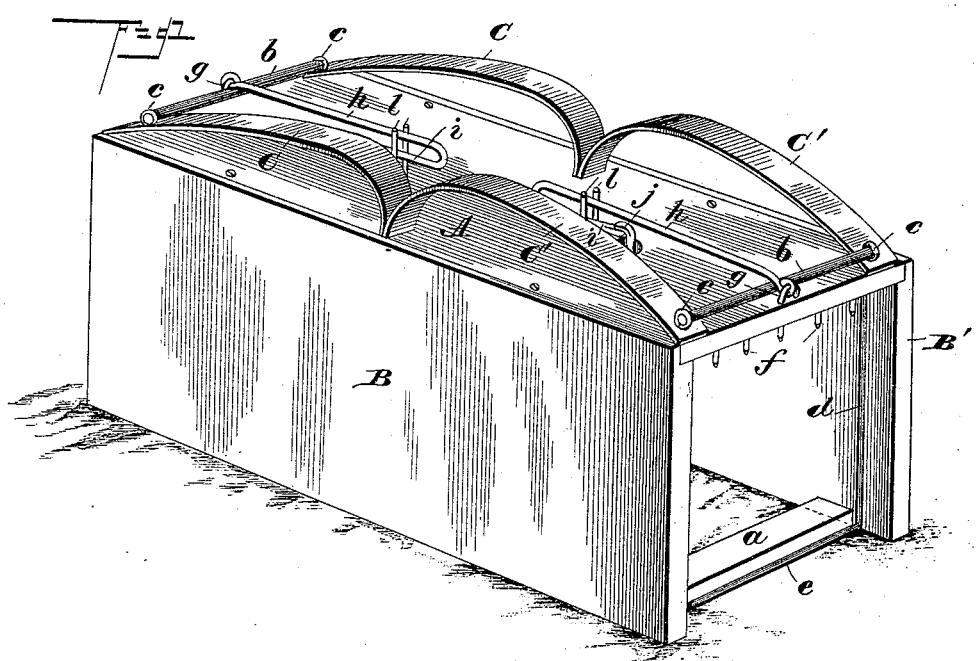
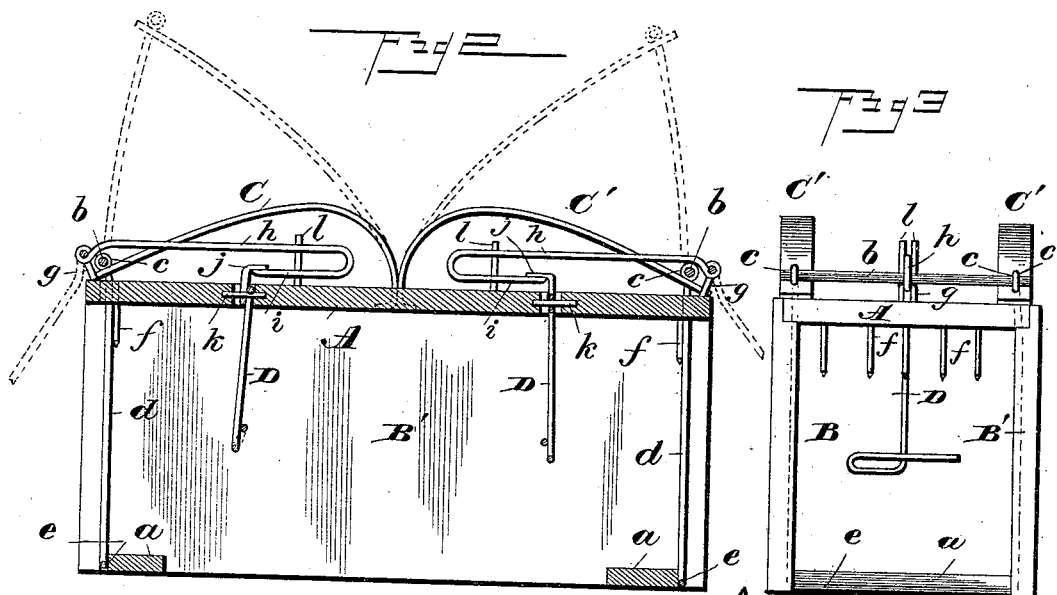
Witnesses
John Imirie
E. W. Johnson
Inventor
Ford Warner
by [signature]
Attorney

UNITED STATES PATENT OFFICE.

FORD WARNER, OF KEWANNA, INDIANA.

ANIMAL-TRAP.

SPECIFICATION forming part of Letters Patent No. 450,545, dated April 14, 1891.

Application filed June 28, 1890. Serial No. 357,147. (Model.)

*To all whom it may concern:*

Be it known that I, FORD WARNER, a citizen of the United States of America, residing at Kewanna, in the county of Fulton and State of Indiana, have invented certain new and useful Improvements in Animal-Traps; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has reference to animal-traps; and it consists in the improved construction hereinafter described and set forth, whereby a novel arrangement of springs is provided that will be positively operated at all times, and are so constructed that they will not loose their resiliency.

The invention also consists in certain improvements in the trip-catch, whereby when adjusted it will not be liable to become disengaged except at the proper time.

In the accompanying drawings, forming part of this specification, Figure 1 is a perspective view of a trap embodying my improvements. Fig. 2 is a longitudinal vertical sectional view, and Fig. 3 is an end view, of the same.

The main portion of the trap consists of a casing comprising top A and vertical sides B B', the latter being braced at their lower portions adjacent to each end by cross-bars $a$ $a$. Upon the top and at each side of the same is located a pair of leaf-springs C C' of the form shown most clearly in Figs. 1 and 2, and secured at their inner ends to the top A by being inserted in a vertical opening therein and then bent oppositely against the under side of the same. The free ends of the corresponding springs C C and C' C' are connected together by means of a cross-rod $b$, the ends of which are retained in loops $c$, carried by the said springs and formed at the upper ends of the vertical sides $d$ of a yoke depending into the casing at the end thereof and having the lower cross-bar $e$. Depending from the under side of the top and on a line with the bar $e$ is a series of impalement-teeth $f$. On the top A, adjacent to each end, is a loop $g$, to which is pivotally attached a link $h$, the free end of which is bent to form a hook $i$, adapted to engage the bent upper end $j$ of a trip-catch D, extending through an opening in the top A and looped to hang in a horizontal pivot $k$, located in said opening. The lower depending portion of the trip-catch depending into the casing is bent horizontally, as shown in Fig. 3, to provide a proper portion for affixing the bait.

It will be noted that the side portions $d$ $d$ of the yoke are seated in vertical grooves or channels in the inner faces of the sides B B', so that said portions $d$ $d$ are not only properly guided, but they are protected against jar or vibration to which they might otherwise be subjected were they more exposed. When the trap is set, the cross-bar $e$ of the yoke rests parallel with the adjacent cross-bar $a$, so that it also is protected against undesirable contact.

To set the trap it will only be necessary to depress the springs at one end, as shown in full lines, and while so depressed fold the link back to a horizontal position, so that its hook may be engaged by the bent end of the trip-catch D, the pressure exerted by the springs serving to hold said hook and end in engagement, and thereby retain the parts in a set position. Of course, depressing the springs at one end serves also to lower the yoke thereat, and this latter is so situated in relation to the bait portion of the trip-catch that the forward part of the animal's body will have entered the trap at the time he seizes the bait and releases the link and springs and causes the yoke to force his body to impale it upon the teeth $f$. In order to prevent lateral movement of the link and thus prevent accidental disengagement, I provide two vertical pins $l$ $l$ for each link between which it moves and is guided.

From the foregoing it will be seen that the springs give great power to the trap, and by reason of their leaf character are not liable to loose their resiliency or force. Considering the great strength of the trap the devices composing the same are extremely simple and positive.

Having thus described my invention, what I claim as new, and desire to secure by Letters Patent, is—

1. In an animal-trap, the combination, with the casing having the sides provided with inner vertical channels and lower cross-bar adjacent to the end, of a pair of leaf-springs secured to the top at their inner ends, a vertical yoke located adjacent to the entrance of said casing and actuated by the free ends of said springs, the sides of said yoke being guided and protected in the side channels while the cross-rod is protected by the said lower transverse bar connecting the casing sides, substantially as set forth.

2. The combination, with the casing having entrances at its ends, of a double pair of reversed leaf-springs reversed relative to each other, the adjacent ends of the springs at each side bearing against each other and being inserted in a common opening and bent back, as described, together with yokes actuated by the free ends of each parallel pair of springs, and link and trip catch devices, substantially as set forth.

In testimony whereof I affix my signature in presence of two witnesses.

FORD WARNER.

Witnesses:
ROBERT S. LOWFRY,
RUFUS BLAIR.